United States Patent Office 3,488,323
Patented Jan. 6, 1970

3,488,323
POLYOXYMETHYLENE COPOLYMERS FROM TRI-
OXANE AND CYCLIC ALKENYL-ACETALS
Gianfranco Pregaglia and Giancarlo Pozzi, Milan, and
Paolo Roffia, Mantova, Italy, assignors to Montecatini
Edison S.p.A., Milan, Italy, a corporation of Italy
No Drawing. Filed May 13, 1966, Ser. No. 549,800
Claims priority, application Italy, May 14, 1965,
10,890/65, Patent 760,968
Int. Cl. C08g 1/00
U.S. Cl. 260—73                       2 Claims

ABSTRACT OF THE DISCLOSURE

Polymers consisting mainly of —CH$_2$O— groups but being more heatstable than polyoxymethylene homopolymers are obtained by copolymerizing trioxane and cyclic acetals having 5–6 atoms in the ring and containing a vinyl or propenyl group linked to the carbon atom bridging the oxygens of acetalic type, in contact with catalysts which react as Lewis acids. The vinyl or propenyl groups present in the copolymers are capable of reacting, in the molten state or in solution, with agents which modify the copolymers, such as cross-linking agents, stabilizers, coloring agents, etc.

---

It is known that it is possible to prepare copolymers having high thermal stability, substantantially consisting of recurring —CH$_2$O— units. These products can be obtained by copolymerizing trioxane with particular monomers, such as cyclic anhydrides or epoxides. In the latter case, the polyoxymethylene polymers contain enchained —O—CH$_2$—CH$_2$— units and are characterized by a thermal stability which is considerably higher than that of polyoxymethylene homopolymers.

The object of the present invention is new polymers having a higher resistance to thermal degradation with respect to the polyoxymethylene polymer.

The new polymers consist mainly of monomeric —CH$_2$O— units and contain enchained oxyalkylene units at least in part adjacent to units of —OCH—R type, where R is an unsaturated hydrocarbon group containing from 2 to 5 carbon atoms.

Another object of the present invention is the copolymerization of trioxane with monomers of the acetalic type which are characterized by the presence of at least one unsaturation of vinyl or propenyl type. These cyclic acetals with 5 or 6 atoms in the ring contain a vinyl or propenyl group linked to the carbon atom which bridges the oxygens of acetalic type, $$R'-CH=CH-CH{\Large\langle}{}^{O-}_{O-}$$

wherein R' is H or a methyl group.

The advantage offered by the use of these particular monomers resides in obtaining polymers having a polyoxymethylene structure in which the vinyl or propenyl groups present are capable of reacting in the molten state or in solution with modifiers of the polymer, such as cross-linking agents, coloring agents, stabilizers, etc.

Examples of these comonomers consisting of a ring with 5 or 6 atoms of acetalic structure are: 2-vinyl-dioxolane (I), 2-propenyl-dioxolane (II), 2,4,8,10-tetraoxa-3,9-divinyl-spiro[5,5]-undecane (III).

(I) 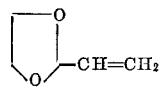

(II) 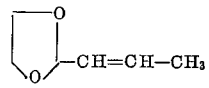

(III) 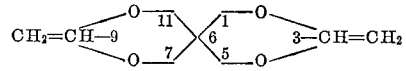

The compound (I) can be obtained from acrolein and ethylene glycol, compound (II) from crotonic aldehyde and ethylene glycol, and compound (III) from acrolein and pentaerythritol (Ind. Eng. Chem. 46, page 787, 1954).

In the polymerization, the comonomer reacts by the opening of a C—O bond and is thus added to the growing polyoxymethylene chain. The chain sections, in which only acetalic bonds are present, are separated by monomeric units which introduce, into the chain, sequences of at least two adjacent carbon atoms.

The copolymer obtained from the polymerization reaction consists mainly of oxymethylenic sequences separated by oxyalkylene units derived from the respective comonomers:

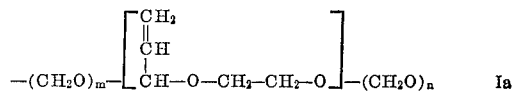    Ia

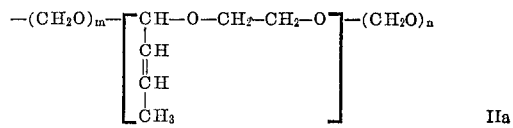    IIa

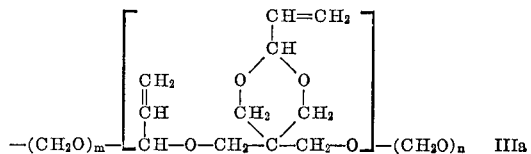    IIIa where $m$ and $n$ are integers varying from 3 to 2000.

The copolymers obtained are solid, with a melting point somewhat lower than that of the polyoxymethylene homopolymer. The melting point of our copolymers is preferably between 150° and 170° C. and the inherent viscosity measured in dimethylformamide (0.5% by weight of the sample) at 150° C. is comprised between 0.4 and 0.8. They can be processed into manufactured articles using the usual molding and extrusion techniques employed for oxymethylene polymers.

The monomer is added to the trioxane in amounts varying between 0.01 and 50 mols, preferably between 0.1 and 15 mols, per 100 mols of trioxane.

The comonomer can be used either alone, or in admixture with other monomers capable of copolymerizing with trioxane, such as: dioxolane, ethylene oxide, 1,4-dioxa-spiro[4,5]-decane, 2,4-dimethyl-dioxolane, hexahydrobenzotrioxyepane and 4-methyl-metadioxane.

The catalysts used for the preparation of the copolymers according to this invention are in general, the compounds reacting as Lewis acids; for instance, compounds containing chlorine or fluorine atoms, such as antimony fluoride, antimony fluoroborate, phosphorous pentachloride, and stannic tetrachloride. The catalysts preferred for the copolymerization are FeCl$_3$ and BF$_3$ either alone, or complexed with organic compounds in which oxygen or sulphur is the electron-donor atom, for example BF$_3$·(C$_2$H$_5$)$_2$O and BF$_3$·(CH$_3$)$_2$S.

The catalyst must be present in an amount between 0.0001 and 0.1% by weight of trioxane, preferably between 0.001 and 0.01%.

The trioxane used must be anhydrous or substantially anhydrous.

The copolymerization is preferably carried out in the absence of solvents, but it can also be operated in hydrocarbon solutions such as benzene and cyclohexane, or solutions of chloro-alkanes such as methylene chloride, or solutions of nitroarenes such as nitrobenzene.

The polymerization reaction temperature is between 30 and 120° C., preferably between 50 and 90° C.

The following examples are given to explain, but not to limit, the present invention.

Example 1

127 g. of trioxane, made anhydrous by heating to the boiling point in contact with a sodium-potassium alloy, are distilled in nitrogen atmosphere and condensed in a three-neck 250 cc. flask, provided with a sidecock and a stirrer. At the end of the distillation, 6 cc. of 2-vinyl-dioxolane are added, and the mass is heated at 70° C. while stirring, until a homogeneous solution is obtained. By means of a hypodermic syringe, piercing the rubber plug provided on one of the necks of the flask, 3 cc. of a 0.07 M solution of $BF_3 \cdot (C_2H_5)_2O$ in nitrobenzene are added.

The polymerization has a short initial induction period and thereafter is very rapid. Therefore, after 10 minutes the polymerization is stopped by the addition of an excess of methanol.

The polymer, reduced to finely divided powder, is washed with an ammonia solution while heating, and subsequently with acetone.

After drying under the mechanical pump, 127 g. of polymer are weighed. A sample, containing 0.5% of N-phenyl-beta-naphthylamine, is heated under vacuum at 180° C. for 2 hours in order to remove the unstable fraction, amounting to 14%. The residue is examined on the thermogravimetric balance at 225° C., under nitrogen.

The loss in weight, as measured at 225° C., does not exceed 0.06% per minute. The inherent viscosity of the polymer is 0.4, as measured in dimethylformamide at 150° C.

Example 2

By operating as in Example 1, 141 g. of trioxane are copolymerized with 5.5 g. of 2,4,8,10-tetraoxa-3,9-divinyl-spiro[5,5]-undecane, with the aid of 1 cc. of a 0.07 M solution of $BF_3 \cdot (C_2H_5)_2O$ in nitrobenzene. The polymerization occurs immediately. The polymerization is stopped by the addition of an excess of methanol. The polymer is then ground, washed, and dried. It weighs 115 g.

A sample, containing 0.5% of N-phenyl-beta-naphthylamine, is heated under vacuum at 180° C. for 2 hours in order to remove the unstable fraction, amounting to 20%. The residue is examined on the thermogravimetric balance. The loss in weight, as measured at 225° C., does not exceed 0.05° per minute.

The inherent viscosity of the polymer is 0.6, as measured in dimethylformamide at 150° C.

Example 3

By operating as in Example 1, 149 g. of trioxane are copolymerized with 6 cc. of 2-propenyl-dioxolane with the aid of 3 cc. of a 0.07 M solution of $BF_3 \cdot (C_2H_5)_2O$ in nitrobenzene. The polymerization has an induction period of some minutes, but then proceeds very quickly. The ground polymer, washed and dried, weighs 126 g.

A sample, containing 0.5% of N-phenyl-beta-naphthylamine, is heated under vacuum at 180° C. for 2 hours in order to remove the unstable fraction. The residue is examined on the thermogravimetric balance. The loss of weight, as measured at 225° C., does not exceed 0.03% per minute. The inherent viscosity of the polymer is 0.5, as measured in dimethylformamide at 150° C.

Example 4

By operating as in Example 1, 130 g. of trioxane are copolymerized with 4 cc. of 2-vinyl-dioxolane and 2 cc. of dioxolane, with the aid of 2 cc. of a 0.07 M solution of $BF_3 \cdot (C_2H_5)_2O$ in nitrobenzene. The polymerization has a short induction period, but thereafter proceeds very quickly.

The ground polymer, washed and dried, weighs 120 g.

A sample, containing 0.5% of N-phenyl-beta-naphthylamine, is heated under vacuum to 180° C. in order to remove the unstable fraction, about 3%.

The residue is examined on the thermogravimetric balance. The loss in weight, as measured at 225° C., does not exceed 0.03% by weight per minute. The inherent viscosity of the polymer is 0.7, as measured in dimethylformamide at 150° C.

As will be apparent, various changes in details may be made in the practice of this invention without departing from the spirit thereof. It is intended, therefore, to include in the scope of the appended claims, all such modifications in details as will be obvious to those skilled in the art from the description and working examples given herein.

What is claimed is:

1. High molecular weight polyoxymethylene copolymers consisting essentially of oxymethylene sequences separated by units derived from the opening of the cyclic acetal, 2, 4, 8, 10-tetraoxa-3,9-divinyl-spiro [5,5] undecane and having a chain repeating structure $$-(CH_2O)_m-\underset{\underset{CH}{\overset{\|}{CH_2}}}{CH}-O-CH_2-\underset{\underset{O\diagdown \diagup O}{H_2C\diagup \diagdown CH_2}}{\overset{}{C}}-CH_2-O-(CH_2O)_n$$

$$\underset{CH=CH_2}{CH}$$

in which $m$ and $n$ are whole numbers between 3 and 2000.

2. Copolymers according to claim 1, in which the ratio of oxymethylene sequences to units derived from the cyclic acetal is from 6:1 to 2000:1.

References Cited

UNITED STATES PATENTS

| 3,087,913 | 4/1963 | Kray et al. | 260—73 |
| 3,245,927 | 4/1966 | Ikeda | 260—73 XR |
| 3,296,210 | 1/1967 | Wilson et al. | 260—73 |
| 3,306,877 | 2/1967 | Schott et al. | 260—73 XR |
| 3,299,003 | 1/1967 | Bader et al. | 260—67 |
| 3,393,157 | 7/1968 | Janssen et al. | 260—2 |

FOREIGN PATENTS

| 1,022,564 | 3/1966 | Great Britain. |

WILLIAM H. SHORT, Primary Examiner

L. M. PHYNES, Assistant Examiner

U.S. Cl. X.R.

260—45.9